(12) United States Patent
Swallow et al.

(10) Patent No.: US 9,486,791 B2
(45) Date of Patent: Nov. 8, 2016

(54) $NO_x$ TRAP

(71) Applicant: Johnson Matthey Public Limited Company, London (GB)

(72) Inventors: Daniel Swallow, Sandy (GB); Paul Richard Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/367,579

(22) PCT Filed: Dec. 19, 2012

(86) PCT No.: PCT/IB2012/002754
§ 371 (c)(1),
(2) Date: Jun. 20, 2014

(87) PCT Pub. No.: WO2013/093597
PCT Pub. Date: Jun. 27, 2013

(65) Prior Publication Data
US 2015/0190793 A1 Jul. 9, 2015

Related U.S. Application Data

(60) Provisional application No. 61/578,952, filed on Dec. 22, 2011.

(51) Int. Cl.
| | |
|---|---|
| *B01J 21/00* | (2006.01) |
| *B01J 21/04* | (2006.01) |
| *B01J 23/00* | (2006.01) |
| *B01J 23/02* | (2006.01) |
| *B01J 23/08* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/56* | (2006.01) |

(Continued)

(52) U.S. Cl.
CPC ............ *B01J 29/76* (2013.01); *B01D 53/9422* (2013.01); *B01D 53/9431* (2013.01); *B01J 20/02* (2013.01); *B01J 20/041* (2013.01); *B01J 20/06* (2013.01); *B01J 20/08* (2013.01); *B01J 20/103* (2013.01); *B01J 20/28042* (2013.01); *B01J 20/3204* (2013.01); *B01J 20/3236* (2013.01); *B01J 20/3289* (2013.01); *B01J 21/04* (2013.01); *B01J 23/10* (2013.01); *B01J 23/42* (2013.01); *B01J 23/44* (2013.01); *B01J 23/464* (2013.01); *B01J 23/52* (2013.01); *B01J 23/63* (2013.01); *B01J 35/04* (2013.01); *B01J 37/0217* (2013.01); *B01J 37/0228* (2013.01); *B01J 37/0244* (2013.01); *F01N 3/0814* (2013.01); *B01D 2253/1122* (2013.01); *B01D 2255/106* (2013.01); *B01D 2255/1021* (2013.01); *B01D 2255/1023* (2013.01); *B01D 2255/1025* (2013.01); *B01D 2255/202* (2013.01); *B01D 2255/206* (2013.01); *B01D 2255/2042* (2013.01); *B01D 2255/2065* (2013.01); *B01D 2255/2092* (2013.01); *B01D 2255/50* (2013.01); *B01D 2255/9025* (2013.01); *B01D 2255/91* (2013.01); *B01D 2257/404* (2013.01); *Y02T 10/24* (2013.01)

(58) Field of Classification Search
CPC .......... B01J 21/00; B01J 21/04; B01J 21/06; B01J 21/08; B01J 21/10; B01J 21/12; B01J 21/14; B01J 23/00; B01J 23/02; B01J 23/04; B01J 23/10; B01J 23/42; B01J 23/44; B01J 23/464; B01J 23/52; B01J 23/54; B01J 23/56; B01J 23/58; B01J 23/63; B01J 23/66
USPC ........ 502/258–263, 304, 326–328, 330–334, 502/339, 349–351, 355, 415, 439, 527.12, 502/527.13
See application file for complete search history.

(56) References Cited

U.S. PATENT DOCUMENTS

| | | | | |
|---|---|---|---|---|
| 6,764,665 B2 * | 7/2004 | Deeba | ................. | B01D 53/865 423/213.5 |
| 7,276,212 B2 * | 10/2007 | Hu | .................... | B01D 53/9454 422/168 |

(Continued)

FOREIGN PATENT DOCUMENTS

| | | |
|---|---|---|
| EP | 0992276 A1 | 4/2000 |
| WO | 2010129490 A2 | 11/2010 |

Primary Examiner — Cam N. Nguyen
(74) Attorney, Agent, or Firm — Jimmie Johnson

(57) ABSTRACT

A $NO_x$ trap, and its use in an exhaust system for internal combustion engines, is disclosed. The $NO_x$ trap comprises a substrate and three layers on the substrate. The first layer comprises a first platinum group metal, a first $NO_x$ storage component, and a first support; the second layer comprises a second platinum group metal, a second $NO_x$ storage component, and a second support; and the third layer comprises rhodium and a third support. The platinum group metal loading in the first layer is from 1 to 40 percent of the platinum group metal loading in the second layer. In addition, the first $NO_x$ storage component and the second $NO_x$ storage component are the same, and the first support and the second support are the same. The $NO_x$ trap is less prone to deactivation over numerous desulfation/$NO_x$ trap regeneration cycles.

9 Claims, No Drawings

(51) Int. Cl.
*B01J 23/58* (2006.01)
*B01J 23/72* (2006.01)
*B01J 20/00* (2006.01)
*B01J 29/76* (2006.01)
*B01J 37/02* (2006.01)
*B01J 23/63* (2006.01)
*B01D 53/94* (2006.01)
*B01J 35/04* (2006.01)
*F01N 3/08* (2006.01)
*B01J 23/46* (2006.01)
*B01J 23/52* (2006.01)
*B01J 20/02* (2006.01)
*B01J 20/04* (2006.01)
*B01J 20/06* (2006.01)
*B01J 20/08* (2006.01)
*B01J 20/32* (2006.01)
*B01J 20/28* (2006.01)
*B01J 20/10* (2006.01)

(56) References Cited

U.S. PATENT DOCUMENTS

| | | | | |
|---|---|---|---|---|
| 7,329,629 B2* | 2/2008 | Gandhi | ............... | B01D 53/945 502/304 |
| 7,517,510 B2* | 4/2009 | Chen | ............... | B01D 53/945 422/168 |
| 7,524,465 B2* | 4/2009 | Kumar | ............... | B01J 23/44 422/180 |
| 7,550,124 B2* | 6/2009 | Chen | ............... | B01D 53/945 422/168 |
| 7,758,834 B2* | 7/2010 | Chen | ............... | B01D 53/945 423/213.2 |
| 7,981,390 B2* | 7/2011 | Galligan | ............... | B01J 23/002 423/213.5 |
| 8,323,599 B2* | 12/2012 | Nunan | ............... | B01D 53/945 423/213.2 |
| 8,329,607 B2* | 12/2012 | Kazi | ............... | B01D 53/944 422/180 |
| 8,394,348 B1* | 3/2013 | Nunan | ............... | B01D 53/945 423/213.2 |
| 8,568,675 B2* | 10/2013 | Deeba | ............... | B01D 53/945 422/177 |
| 8,617,496 B2* | 12/2013 | Wei | ............... | B01J 23/63 423/213.2 |
| 8,637,426 B2* | 1/2014 | Hoke | ............... | B01D 53/945 502/333 |
| 8,667,785 B2* | 3/2014 | Blakeman | ............... | B01J 35/0006 423/213.5 |
| 8,734,743 B2* | 5/2014 | Muller-Stach | ............... | B01D 53/945 422/170 |
| 8,828,343 B2* | 9/2014 | Liu | ............... | B01D 53/945 423/213.5 |
| 8,833,064 B2* | 9/2014 | Galligan | ............... | B01D 53/945 423/213.5 |
| 8,950,174 B2* | 2/2015 | Hilgendorff | ............... | B01D 53/945 423/213.2 |
| 9,044,734 B2* | 6/2015 | Grubert | ............... | B01J 29/04 |
| 2003/0021745 A1 | 1/2003 | Chen | | |
| 2004/0001781 A1* | 1/2004 | Kumar | ............... | B01J 23/44 422/180 |
| 2007/0269353 A1* | 11/2007 | Li | ............... | B01D 53/9418 422/176 |
| 2010/0183490 A1* | 7/2010 | Hoke | ............... | B01D 53/945 423/213.5 |
| 2010/0215557 A1 | 8/2010 | Liu et al. | | |
| 2011/0173950 A1* | 7/2011 | Wan | ............... | F01N 3/10 60/274 |
| 2011/0305612 A1 | 12/2011 | Muller-Stach et al. | | |
| 2013/0058848 A1* | 3/2013 | Nunan | ............... | B01D 53/945 423/213.5 |

* cited by examiner

$NO_x$ TRAP

FIELD OF THE INVENTION

The invention relates to a $NO_x$ trap for exhaust systems for internal combustion engines, and a method for treating an exhaust gas from an internal combustion engine.

BACKGROUND OF THE INVENTION

Internal combustion engines produce exhaust gases containing a variety of pollutants, including hydrocarbons, carbon monoxide, nitrogen oxides ("$NO_x$"), sulfur oxides, and particulate matter. Increasingly stringent national and regional legislation has lowered the amount of pollutants that can be emitted from such diesel or gasoline engines. Many different techniques have been applied to exhaust systems to clean the exhaust gas before it passes to atmosphere.

One such technique utilized to clean exhaust gas is the $NO_x$ trap (or "$NO_x$ adsorber catalyst"). $NO_x$ traps are devices that adsorb $NO_x$ under lean exhaust conditions, release the adsorbed $NO_x$ under rich conditions, and reduce the released $NO_x$ to form $N_2$. A $NO_x$ trap typically includes a $NO_x$ adsorbent for the storage of $NO_x$ and an oxidation/reduction catalyst.

The $NO_x$ adsorbent component is typically an alkaline earth metal (such as Ba, Ca, Sr, and Mg), an alkali metal (such as K, Na, Li, and Cs), a rare earth metal (such as La, Y, Pr, and Nd), or combinations thereof. These metals are typically found in the form of oxides. The oxidation/reduction catalyst is typically one or more noble metals, preferably platinum, palladium, and/or rhodium. Typically, platinum is included to perform the oxidation function and rhodium is included to perform the reduction function. The oxidation/reduction catalyst and the $NO_x$ adsorbent are typically loaded on a support material such as an inorganic oxide for use in the exhaust system.

The $NO_x$ trap performs three functions. First, nitric oxide reacts with oxygen to produce $NO_2$ in the presence of the oxidation catalyst. Second, the $NO_2$ is adsorbed by the $NO_x$ adsorbent in the form of an inorganic nitrate (for example, BaO or $BaCO_3$ is converted to $Ba(NO_3)_2$ on the $NO_x$ adsorbent). Lastly, when the engine runs under rich conditions, the stored inorganic nitrates decompose to form NO or $NO_2$ which are then reduced to form $N_2$ by reaction with carbon monoxide, hydrogen and/or hydrocarbons in the presence of the reduction catalyst. Typically, the nitrogen oxides are converted to nitrogen, carbon dioxide and water in the presence of heat, carbon monoxide and hydrocarbons in the exhaust stream.

Unfortunately, the presence of sulfur compounds in the diesel or gasoline fuel is detrimental to $NO_x$ traps since the oxidation of sulfur compounds leads to sulfur oxides in the exhaust gas. In the $NO_x$ trap, sulfur dioxide is oxidized to sulfur trioxide over the oxidation catalyst and the $NO_x$ adsorbent reacts with the sulfur trioxide to produce surface sulfates (e.g., barium oxide or barium carbonate reacts with sulfur trioxide to form barium sulfate). These sulfates are more stable than the nitrates and require higher temperatures (>650° C.) to desulfate. However, the extreme conditions required for desulfation and $NO_x$ trap regeneration can lead to longer term deactivation of the $NO_x$ trap and may lead to shortened $NO_x$ trap life.

U.S. Appl. Pub. No. 2010/0215557 describes an aging-resistant three way catalyst for reducing $NO_x$ in exhaust gases. The three way catalyst preferably comprises three layers: (1) a bottom "etch coat" layer containing no platinum group metals; (2) a middle (first catalytic) layer comprising Pd on a ceria-free oxygen storage component and Pt on a refractory metal oxide; and (3) a second catalytic layer formed on the first catalytic layer, comprising Pt on an oxygen storage component and Rh on zirconia-coated or yttria-coated alumina. U.S. Appl. Pub. No. 2010/0215557 does not describe the effects of sulfur on its catalyst.

As with any automotive system and process, it is desirable to attain still further improvements in exhaust gas treatment systems. We have discovered a new $NO_x$ trap that is less prone to deactivation over numerous desulfation/$NO_x$ trap regeneration cycles.

SUMMARY OF THE INVENTION

The invention is a $NO_x$ trap for use in an exhaust system for internal combustion engines. The $NO_x$ trap comprises a substrate and three layers on the substrate. The first layer comprises a first platinum group metal, a first $NO_x$ storage component, and a first support; the second layer comprises a second platinum group metal, a second $NO_x$ storage component, and a second support; and the third layer comprises rhodium and a third support. The platinum group metal loading in the first layer is from 1 to 40 percent of the platinum group metal loading in the second layer. In addition, the first $NO_x$ storage component and the second $NO_x$ storage component are the same, and the first support and the second support are the same. The $NO_x$ trap is less prone to deactivation over numerous desulfation/$NO_x$ trap regeneration cycles.

DETAILED DESCRIPTION OF THE INVENTION

The $NO_x$ trap of the invention comprises a substrate and three layers on the substrate. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

The metallic substrate may be made of any suitable metal, and in particular heat-resistant metals and metal alloys such as titanium and stainless steel as well as ferritic alloys containing iron, nickel, chromium, and/or aluminum in addition to other trace metals.

The substrate is preferably a flow-through substrate or a filter substrate. Most preferably, the substrate is a flow-through substrate. In particular, the flow-through substrate is a flow-through monolith preferably having a honeycomb structure with many small, parallel thin-walled channels running axially through the substrate and extending throughout the substrate. The channel cross-section of the substrate may be any shape, but is preferably square, sinusoidal, triangular, rectangular, hexagonal, trapezoidal, circular, or oval.

The first layer comprises a first platinum group metal ("PGM"), a first $NO_x$ storage component, and a first support. The first PGM is preferably platinum, palladium, gold, or mixtures thereof; most preferably, the first PGM is platinum, palladium, or mixtures thereof.

The first $NO_x$ storage component preferably comprises alkaline earth metals (such as barium, calcium, strontium, and magnesium), alkali metals (such as potassium, sodium, lithium, and cesium), rare earth metals (such as lanthanum, yttrium, praseodymium and neodymium), or combinations thereof. Most preferably, the first $NO_x$ storage component comprises barium, cerium, or mixtures thereof. These metals are typically found in the form of oxides, but may also be supported on supports such as alumina or ceria.

The first support is preferably an inorganic oxide, and more preferably includes oxides of Groups 2, 3, 4, 5, 13 and 14 elements. Most preferably, the first support is an alumina, silica, titania, zirconia, magnesia, ceria, niobia, tantalum oxide, molybdenum oxide, tungsten oxide, a mixed oxide or composite oxide of any two or more thereof (e.g. silica-alumina, magnesia-alumina, ceria-zirconia or alumina-ceria-zirconia), and mixtures thereof. Useful inorganic oxides preferably have surface areas in the range 10 to 1500 $m^2/g$, pore volumes in the range 0.1 to 4 mL/g, and pore diameters from about 10 to 1000 Angstroms. High surface area supports having a surface area greater than 80 $m^2/g$ are particularly preferred.

A second layer of the $NO_x$ trap comprises a second platinum group metal, a second $NO_x$ storage component, and a second support. The second PGM is preferably platinum, palladium, gold, or mixtures thereof; most preferably, the second PGM is platinum, palladium, or mixtures thereof.

The second $NO_x$ storage component preferably comprises an alkaline earth metal (such as barium, calcium, strontium, and magnesium), an alkali metal (such as potassium, sodium, lithium, and cesium), a rare earth metal (such as lanthanum, yttrium, praseodymium and neodymium), or combinations thereof. Most preferably, the second $NO_x$ storage component comprises barium, cerium, or mixtures thereof. These metals are typically found in the form of oxides, but may also be supported on supports such as alumina or ceria.

The second support is preferably an inorganic oxide, and more preferably includes oxides of Groups 2, 3, 4, 5, 13 and 14 elements. Most preferably, the second support is an alumina, silica, titania, zirconia, magnesia, ceria, niobia, tantalum oxide, molybdenum oxide, tungsten oxide, a mixed oxide or composite oxide of any two or more thereof (e.g. silica-alumina, magnesia-alumina, ceria-zirconia or alumina-ceria-zirconia), and mixtures thereof. Useful inorganic oxides preferably have surface areas in the range 10 to 1500 $m^2/g$, pore volumes in the range 0.1 to 4 mL/g, and pore diameters from about 10 to 1000 Angstroms. High surface area supports having a surface area greater than 80 $m^2/g$ are particularly preferred.

The first $NO_x$ storage component of the first layer and the second $NO_x$ storage component of the second layer are the same. Thus, if barium oxide is the $NO_x$ storage component used in the first layer, barium oxide is also used in the second layer. The first support of the first layer and the second support of the second layer are also same. Thus, is alumina is used as the support in the first layer, alumina is also used in the second layer.

In addition, the platinum group metal loading in the first layer (in mass of PGM per volume of first layer, e.g., in g/L or $g/ft^3$) is from 1 to 40 percent of the platinum group metal loading in the second layer. More preferably, the platinum group metal loading in the first layer is from 5 to 30 percent of the platinum group metal loading in the second layer. Thus, a much smaller amount of PGM is located in the first layer on the substrate. Preferably, the PGM loading in the second layer will range from 20 to 300 $g/ft^3$, and the PGM loading in the first layer will range from 0.3 to 90 $g/ft^3$.

A third layer of the $NO_x$ trap comprises rhodium and a third support. The third support is most preferably a cerium oxide, a cerium-zirconium mixed oxide, or a rare earth, alkaline earth, or transition metal-stabilized alumina. Preferably, the rare earth, alkaline earth, or transition metal-stabilized alumina contains a rare earth, alkaline earth, or transition metal comprising lanthanum, barium, praseodymium, yttrium, magnesium, cerium, and cobalt. Preferably, the rare earth, alkaline earth, or transition metal-stabilized aluminum oxide comprises from 0.5 to 5 weight percent rare earth, alkaline earth or transition metal.

The layers of the $NO_x$ trap may be arranged on the substrate in any order, but preferably the first layer is disposed on the substrate, the second layer is disposed on the first layer, and the third layer is disposed on the second layer.

The $NO_x$ trap of the present invention may be prepared by processes well known in the prior art. Preferably, the $NO_x$ trap is prepared by depositing the three layers on the substrate using washcoat procedures. A representative process for preparing the $NO_x$ trap using a washcoat procedure is set forth below. It will be understood that the process below can be varied according to different embodiments of the invention.

The first layer of the $NO_x$ trap is preferably prepared using a washcoat procedure. The first PGM is preferably added to the first support and then combined with the first $NO_x$ adsorbent prior to the washcoating step. The first PGM may be loaded onto the first support by any known means, the manner of addition is not considered to be particularly critical. For example, a platinum, palladium or gold compound (such as platinum nitrate) may be added to the support by impregnation, adsorption, ion-exchange, incipient wetness, precipitation, or the like to produce a supported PGM. Alternatively, the first support and the first $NO_x$ adsorbent may be coated onto the substrate, followed by addition of the first PGM to the coated substrate.

The washcoating is preferably performed by first slurrying finely divided particles of the supported PGM (or just the first support) and the first $NO_x$ adsorbent in an appropriate solvent, preferably water, to form the slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The substrate may then be coated one or more times with the slurry such that there will be deposited on the substrate the desired loading of catalytic materials in the first layer. If only the first support and the first $NO_x$ adsorbent is deposited on the substrate, the first PGM may then be added to the coated substrate by any known means, including impregnation, adsorption, or ion-exchange of a platinum compound (such as platinum nitrate).

Preferably, the entire length of the substrate is coated with the first layer slurry so that a washcoat of the first layer covers the entire surface of the substrate.

After the first layer is deposited onto the substrate, the first layer is typically dried by heating at an elevated temperature of preferably 80 to 150° C. The substrate may also be calcined at higher temperatures (such as 400 to 600° C.) but calcination is typically not required before adding the second layer.

The second layer is then added to the first layer in a similar manner as discussed above, and then dried by heating at an elevated temperature of preferably 80 to 150° C. The substrate may also be calcined at higher temperatures (such as 400 to 600° C.) but calcination is typically not required before the addition of the third layer. Preferably, the entire length of the substrate is coated with the second layer slurry so that a washcoat of the second layer covers the entire surface of the substrate.

The third layer of the $NO_x$ trap is preferably prepared using a washcoat procedure. Rhodium is preferably added to the third support prior to the washcoating step, but alternatively, the third support may be coated onto the second layer followed by addition of rhodium to the coated substrate. If rhodium is added to the third support prior to washcoating the third layer, it can be loaded onto the third support by any known means, the manner of addition is not considered to be particularly critical. For example, a rhodium compound (such as rhodium nitrate) may be added to the support by impregnation, adsorption, ion-exchange, incipient wetness, precipitation, or the like.

The washcoating is preferably performed by first slurrying finely divided particles of the supported rhodium (or just the third support) in an appropriate solvent, preferably water, to form the slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers or promoters may also be incorporated in the slurry as a mixture of water soluble or water-dispersible compounds or complexes.

The substrate may then be coated one or more times with the slurry such that there will be deposited on the substrate the desired loading of catalytic materials in the third layer. If only the third support is deposited on the substrate, the rhodium may then be added to the support-coated substrate by any known means, including impregnation, adsorption, or ion-exchange of a rhodium compound (such as rhodium nitrate).

Preferably, the entire length of the substrate is coated with the third layer slurry so that a washcoat of the third layer covers the entire surface of the substrate.

After the third layer has been coated onto the substrate, the substrate is typically dried and then calcined by heating at an elevated temperature. Preferably, the calcination occurs at 400 to 600° C. for approximately 1 to 8 hours.

Although the preparation of the $NO_x$ trap demonstrated above shows the preferred embodiment where the first layer is disposed on the substrate, the second layer is disposed on the first layer, and the third layer is disposed on the second layer, the first, second, and third layers may be arranged on the substrate in any order using the same procedures described above.

The invention also encompasses an exhaust system for internal combustion engines that comprises the $NO_x$ trap of the invention. Preferably, the exhaust system comprises the $NO_x$ trap with an oxidation catalyst and/or a particulate filter. These after-treatment devices are well known in the art. Particulate filters are devices that reduce particulates from the exhaust of internal combustion engines. Particulate filters include catalyzed soot filters (CSF) and bare (non-catalyzed) particulate filters. Catalyzed soot filters (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Particularly preferred exhaust systems include the $NO_x$ trap followed by a CSF, both close-coupled; a close-coupled $NO_x$ trap with an underfloor CSF; and a close-coupled oxidation catalyst/CSF and an underfloor $NO_x$ trap.

The invention also encompasses treating an exhaust gas from an internal combustion engine, in particular for treating exhaust gas from a vehicular lean burn internal combustion engine, such as a diesel engine, a lean-burn gasoline engine, or an engine powered by liquid petroleum gas or natural gas. The method comprises contacting the exhaust gas with the $NO_x$ trap of the invention.

The following examples merely illustrate the invention. Those skilled in the art will recognize many variations that are within the spirit of the invention and scope of the claims.

EXAMPLE 1

Preparation of Catalyzed Substrates

Comparative Substrate 1A (50-50 PGM Split in $1^{st}$ 2 Layers):

A 400 cells per square inch (cpsi) flow-through cordierite substrate monolith is coated with a three layer $NO_x$ absorber catalyst formulation comprising a first, lower layer comprising 1 g/in$^3$ alumina, 1 g/in$^3$ particulate ceria, 47 g/ft$^3$ Pt, 9.5 g/ft$^3$ Pd, and 200 g/ft$^3$ Ba; a second layer comprising 1 g/in$^3$ alumina, 1 g/in$^3$ particulate ceria, 47 g/ft$^3$ Pt, 9.5 g/ft$^3$ Pd, and 200 g/ft$^3$ Ba; and a third layer comprising 0.5 g/in$^3$ 85 wt. % zirconia doped with rare earth elements and 10 g/ft$^3$ Rh. The first and second layers are coated on the virgin substrate monolith using the method disclosed in WO 99/47260, followed by drying for 30 minutes in a forced air drier at 100° C. and then firing at 500° C. for 2 hours before the third layer is applied and the same drying and firing procedure is repeated.

Comparative Substrate 1B (0-100 PGM Split in $1^{st}$ 2 Layers):

Comparative Substrate 1B is the same as Comparative Substrate 1A except that there is no PGM in the first layer (0 g/ft$^3$ Pt, 0 g/ft$^3$ Pd) and the PGM loading in the second layer is 94 g/ft$^3$ Pt and 19 g/ft$^3$ Pd. The first layer is coated on the virgin substrate monolith using the method disclosed in WO 99/47260 followed by drying for 30 minutes in a forced air drier at 100° C. and then firing at 500° C. for 2 hours before the second layer and third layers are applied and the same drying and firing procedure is repeated.

Substrate 1C of the Invention (20-80 PGM Split in $1^{st}$ 2 Layers):

Substrate 1C is the same as Comparative Substrate 1A except that the PGM loading in the first layer is 18.8 g/ft$^3$ Pt and 3.8 g/ft$^3$ Pd and the PGM loading in the second layer is 75.2 g/ft$^3$ Pt and 15.2 g/ft$^3$ Pd. The three layers are coated using the procedure of Comparative Substrate 1B.

EXAMPLE 2

Testing Procedures

A 35 mm×76.2 mm core of each Example 1 Substrate is aged in an oven at 800° C. for 24 h prior to evaluation. Testing is performed on a synthetic gas rig with all testing done at a GHSV of 45,000 hr$^{-1}$. Prior to evaluation, the cores are pre-conditioned at 600° C. for 5 minutes with a 50 seconds rich/10 seconds lean desulfation. Lean and rich gas conditions are described in Table 1. The temperature is then reduced to 350° C. under $N_2$ and five cycles of 300 seconds lean and 20 seconds rich are performed to evaluate the $NO_x$ conversion efficiency. The stabilized $NO_x$ conversion efficiency of the fifth cycle is shown in Table 2 as the desulfated (start of run) $NO_x$ conversion. 90 ppm of $SO_2$ is then introduced into the gas feed and five cycles of 300 seconds lean and 20 seconds rich are completed thus sulfating the $NO_x$ trap to 2 g/L S loading. The fifth sulfated cycle $NO_x$ conversion is shown in Table 2 as the sulfated (end of run) NO conversion. The temperature is then increased to 600° C. and 5 minutes of desulfation with 50 seconds rich and 10 seconds lean is completed. Following desulfation the temperature is reduced back to 350° C. where five cycles of 300 seconds lean and 20 seconds rich are performed in the absence of $SO_2$ to obtain a desulfated conversion efficiency. This procedure is repeated seven times to give seven sulfated and desulfated $NO_x$ conversion efficiency results over the course of the entire run (see Table 2). The $NO_x$ storage capacity of the three substrates over the course of the run is calculated from the $NO_x$ conversion results. The results are shown in Table 3.

The results show that the substrate of the invention (Substrate 1C) retains both higher $NO_x$ conversion and higher $NO_x$ capacity following a series of sulfation cycles and regenerations, as compared to substrates that have an equal amount of PGM on the first and second layers (Comp. Substrate 1A) and no PGM on the first layer (Comp. Substrate 1B).

TABLE 1

Lean and Rich Gas Conditions

|  | Evaluation Lean | Evaluation Rich | Desulfation Lean | Desulfation Rich |
|---|---|---|---|---|
| Duration (s) | 300 | 20 | 10 | 5 |
| NO (ppm) | 100 | 200 | — | — |
| CO (%) | 0.03 | 2 | 1 | 2 |
| $CO_2$ (%) | 6 | 10 | 6 | 10 |
| $C_3H_6$ (ppm) | 50 | 1700 | 50 | 1700 |
| $H_2$ (%) | 0 | 0.4 | 0 | 0.4 |
| $O_2$ (%) | 11 | 1.5 | 6 | 1.5 |
| $H_2O$ (%) | 12 | 12 | 6.6 | 12 |
| Flow rate (L/min) | 47 | 39 | 47 | 39 |

TABLE 2

$NO_x$ Conversion Results

| | $NO_x$ Conversion (%) | | | | | |
|---|---|---|---|---|---|---|
| Run | Desulfated (Start of Run) | | | Sulfated (End of Run) | | |
| # | Sub. 1A * | Sub. 1B * | Sub. 1C | Sub. 1A * | Sub. 1B * | Sub. 1C |
| 1 | 91 | 91 | 91 | 75 | 79 | 80 |
| 2 | 90 | 91 | 91 | 71 | 75 | 78 |
| 3 | 90 | 91 | 92 | 72 | 77 | 79 |
| 4 | 91 | 91 | 92 | 72 | 77 | 80 |
| 5 | 91 | 91 | 93 | 71 | 77 | 80 |
| 6 | 91 | 91 | 93 | 70 | 77 | 81 |
| 7 | 91 | 92 | 93 | 70 | 77 | 82 |

* Comparison Example

TABLE 3

$NO_x$ Storage Capacity Results

| | $NO_x$ Storage Capacity (g/L) | | | | | |
|---|---|---|---|---|---|---|
| Run | Desulfated (Start of Run) | | | Sulfated (End of Run) | | |
| # | Sub. 1A * | Sub. 1B * | Sub. 1C | Sub. 1A * | Sub. 1B * | Sub. 1C |
| 1 | 0.55 | 0.59 | 0.59 | 0.45 | 0.49 | 0.5 |
| 2 | 0.55 | 0.58 | 0.59 | 0.42 | 0.47 | 0.48 |
| 3 | 0.55 | 0.59 | 0.59 | 0.43 | 0.48 | 0.49 |
| 4 | 0.55 | 0.59 | 0.6 | 0.43 | 0.48 | 0.5 |
| 5 | 0.55 | 0.59 | 0.6 | 0.42 | 0.48 | 0.5 |
| 6 | 0.55 | 0.59 | 0.6 | 0.42 | 0.48 | 0.51 |
| 7 | 0.55 | 0.59 | 0.6 | 0.42 | 0.48 | 0.52 |

* Comparison Example

We claim:

1. A $NO_x$ trap, comprising a substrate and:
   (a) a first layer comprising a first platinum group metal, a first $NO_x$ storage component, and a first support;
   (b) a second layer comprising a second platinum group metal, a second $NO_x$ storage component, and a second support; and
   (c) a third layer comprising rhodium and a third support, wherein the first layer has a platinum group metal loading that is from 1 to 40 percent of the platinum group metal loading in the second layer, the first $NO_x$ storage component and the second $NO_x$ storage component are the same, and the first support and the second support are the same;
   wherein the first layer is disposed on the substrate, the second layer is disposed on the first layer, and the third layer is disposed on the second layer; and
   wherein the first $NO_x$ storage component and the second $NO_x$ storage component comprise an alkaline earth metal, an alkali metal, a rare earth metal, or mixtures thereof.

2. The $NO_x$ trap of claim 1 wherein the substrate is a flow-through monolith.

3. The $NO_x$ trap of claim 1 wherein the first platinum group metal is selected from the group consisting of palladium, platinum, and mixtures thereof.

4. The $NO_x$ trap of claim 1 wherein the second platinum group metal is selected from the group consisting of palladium, platinum, and mixtures thereof.

5. The $NO_x$ trap of claim 1 wherein the first platinum group metal and the second platinum group metal are the same.

6. The $NO_x$ trap of claim 1 wherein the first support and the second support are selected from the group consisting of alumina, silica, titania, zirconia, magnesia, ceria, niobia, tantalum oxides, molybdenum oxides, tungsten oxides, and mixed oxides or composite oxides thereof.

7. The $NO_x$ trap of claim 1 wherein the first NO storage component and the second $NO_x$ storage component comprise barium, cerium, or mixtures thereof.

8. The $NO_x$ trap of claim 1 wherein the third support is selected from the group consisting of a cerium oxide, a cerium-zirconium mixed oxide, and a rare-earth, alkaline earth, or transition metal-stabilized alumina.

9. The $NO_x$ trap of claim 1 wherein the platinum group metal loading in the first layer is from 5 to 30 percent of the platinum group metal loading in the second layer.

* * * * *